United States Patent [19]

Dulger et al.

[11] 4,066,092

[45] Jan. 3, 1978

[54] APPARATUS TO REGULATE THE pH VALUE OR OTHER SIMILAR VALUES OF A SOLUTION

[76] Inventors: Viktor Dulger, Ludolf-Krehl-Strasse 8; Franz Ernst, Langgarten 24a, both of Heidelberg, Germany, 6900

[21] Appl. No.: 754,178

[22] Filed: Dec. 27, 1976

[30] Foreign Application Priority Data

Sept. 13, 1976 Germany .............................. 2641101

[51] Int. Cl.² ............................................ G05D 11/08
[52] U.S. Cl. ................................................... 137/93
[58] Field of Search ...................... 137/88, 90, 91, 92, 137/93, 101.19

[56] References Cited

U.S. PATENT DOCUMENTS

| | | |
|---|---|---|
| 3,605,775 | 9/1971 | Zaander et al. ................... 137/93 X |
| 3,729,013 | 4/1973 | Anderson .............................. 137/93 |

*Primary Examiner*—Robert G. Nilson

[57] ABSTRACT

The invention relates to apparatus for regulating the pH value, or other similar values, of a solution. The apparatus includes an actual value transmitter, a desired value transmitter, a regulator controlled by the two transmitters, and a servo unit controlled by the regulator for adding a measured amount of additive to the solution. The servo unit includes a pulse driven metering pump to provide the supply of additive. The applied pulse frequency has a logarithmic relationship to the control signal derived from an error signal which makes possible exact regulation corresponding to the logarithmic relationship between the pH value and the concentration of additive introduced into the solution.

7 Claims, 1 Drawing Figure

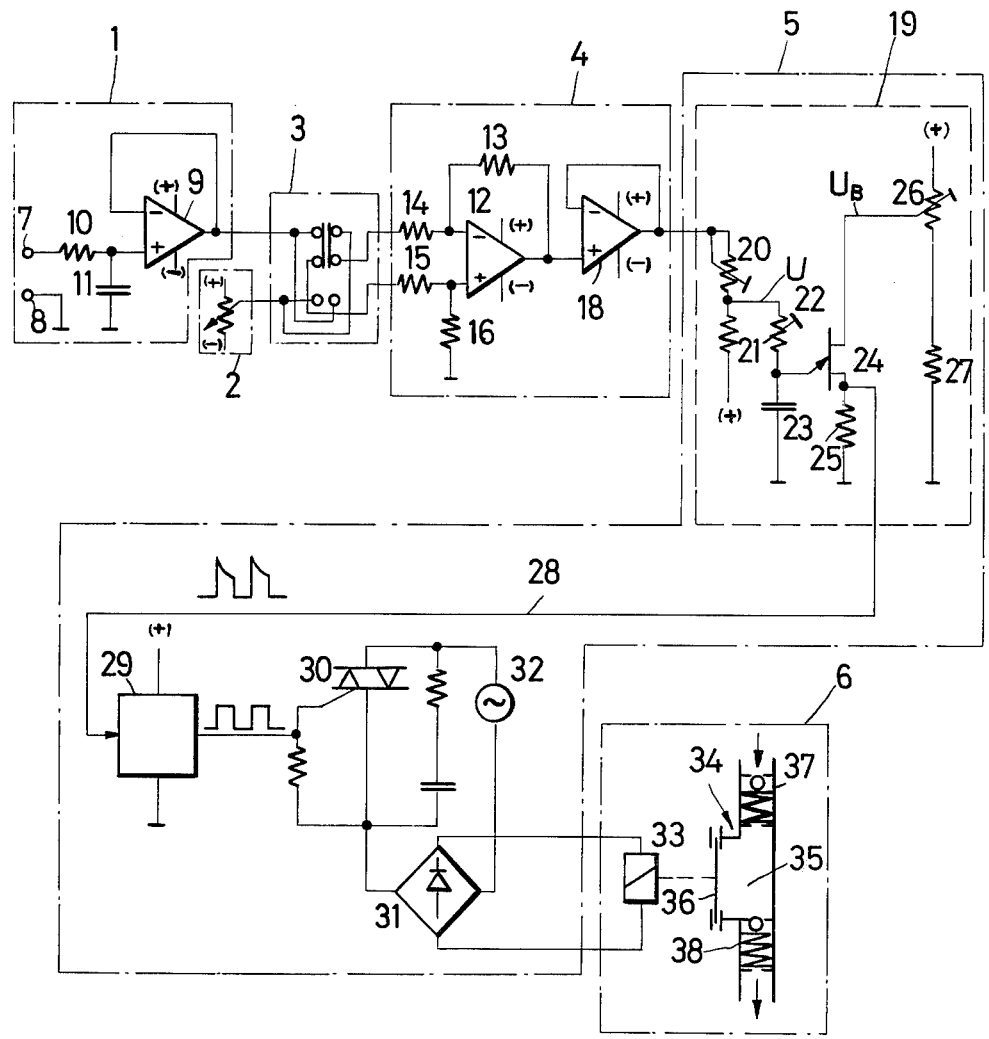

APPARATUS TO REGULATE THE pH VALUE OR OTHER SIMILAR VALUES OF A SOLUTION

The invention concerns an apparatus to regulate the pH value or other similar values of a solution with an actual transmitter, a desired value transmitter and a regulator controlled by the two transmitters followed by a servo unit controlled by the regulator to add a measured amount of additive to the solution.

Apparatus of various kinds for regulating the pH value for neutralizing sewage water are known in which pH value measuring electrodes dip into the sewage water to control an electric regulator which controls an electric motor to move an adjustable valve which controls the flow of neutralizing solution into the flow of sewage water. Such apparatus is expensive, imprecise and of comparatively slow response.

The problem to be solved by the invention is to provide a regulating apparatus of the above type which makes possible a regulating apparatus of the above type which makes possible a quicker and more precise reduction to zero of error signals while using a simpler construction.

According to the invention, the problem is solved by having a pulse driven metering pump to provide the supply of additive, the applied pulse frequency bearing a logarithmic relationship to the control signal derived from an error signal.

A metering pump driven by pulses is able, with each pulse, to carry out a stroke and very quickly add a desired quantity of additive to the solution. It saves the necessity for a separate pressure source to propel the additive as it provides a propelling force to match any required speed of operation. A rotating servo motor is not required. Instead, one can manage with a simple pulse generator. The logarithmic relation between the pulse frequency and the control signal makes possible an exact addition and regulation corresponding to the logarithmic relation between the pH value, or other similar values of the solution, and the concentration of additive introduced into the solution. The metering pump also follows any change in frequency very rapidly so that a quick and exact reduction to zero of error signals is assured.

Preferably it is arranged that the generator forms a voltage controlled oscillator with the control voltage being provided by the difference between actual and desired value signals after amplification. Voltage controlled oscillators and amplifiers (which may be built with very simple components) are cheap to built and maintan — they are required in large quantities by industry — are favoured for control purposes, have high amplification factors and have many possibilities for adjustment. The amplifier can immediately supply the control voltage for the oscillator, connected if need be through a cross coupled difference amplifier used as a simple impedance changer. Not even comparing the desired and actual values, but also correcting the dependent oscillator frequency can be successfully achieved substantially without delay as compared with the low speed of distribution of the additive in the solution.

An especially simple construction is obtained if the oscillator is a Unijunction-Transistor-Oscillator. In the simplest cases this uses only one transistor, one condenser and two resistors.

The most favourable arrangement is when the oscillator pulses are supplied through a timing unit to the gate of a terminal thyristor fed from an A.C. source an electromagnet to operate the stroke diaphragm of the metering pump is in curcuit with the thyristor, and the frequency of the A.C. voltage from the A.C. source is higher than the frequency of the oscillator pulses. In this manner it is possible, with only a few components, to obtain very strong pulses to operate the metering pump, which in combination with the low inertia of the stroke diaphragm gives the metering pump a very quick response and a correspondingly high acceleration of the additive.

The thyristor can be a two-direction-thyristor-triode and the operating electromagnet may be fed from a bridge rectifier fed from an A.C. source through the tyristor. The operating electromagnet receives in this way during each oscillator pulse an uninterupted series of rectified (unidirectional) pulses the frequency of which is twice that of the alternating supply voltage so that even when using the A.C. mains to feed the thyristor a very much higher frequency of pump exciting at each oszillator pulse is obtained than that of the A.C. mains. Therefore, a correspondingly high maximum frequency of pulses from the pulse generator, and thereby for the metering pump, can be selected. This encreases the control senitivity with simple means.

Preferably the connection of the transmitters to the regulator are through a changeover switch. This allows for again encreasing the pulse frequency through a simple changeover when the neutral point of the solution is run through, in order to raise the concentration of additive through the neutral point.

Further, it is preferable that the maximum pulse frequency of the pulse generator is allocated to such an error signal that is higher than a preselected value being much lower than the adjustment range of the actual value. By this development of the regulating apparatus, an error or a control deviation higher than this preselected value will diminish the error with maximum pump frequency until the preselected (low) value of error is reached and thereafter the error is further reduced slowly to zero with slowly decreasing pump frequency. In this way an overswing of the actual value through the desired value is avoided on the one hand, while a high regulating speed is assured on the other hand.

The invention is now described with reference to a schematic diagram of a preferred embodiment of an apparatus for water in a sewer.

The shown regulating apparatus comprises an actual value transmitter 1, a required value transmitter 2, a changeover switch 3, a regulator 4, a pulse generator 5 and a servo unit 6.

The actual value transmitter 1 comprises two measuring electrodes dipping into the waste water, a glass electrode 7 and a reference electrode 8, a direct cross coupled difference amplifier 9 which serves as an impedance changer, the non-reversing input of which is connected to the glass electrode 7 through a high value resistor and through a smoothing capacitor 11 to earth.

The regulator 4 comprises a difference amplifier 12 which has a feedback resistor 13 connected with its reversing input, two input resistors 14 and 15 and to its non-reversing input a shunt resistor. A direct cross coupled difference amplifier 18 serves as an impedance changer on the output side od the regulator.

The output voltage of the regulator 4 controls the pulse generator 5. This comprises a voltage controlled oscillator 19 whose frequency is a logarithmic function of the control voltage. The oscillator 19 includes on one side a voltage divider consisting of a variable resistor 20 and a fixed resistor 21. The voltage divider output is connected to earth through a variable resistor 22 in series with a capacitor 23. The connection between the resistor 22 and the capacitor 23 is connected with the emitter of a uni-junction transistor 24. The one base of the uni-junction transistor 24 is connected to earth through a low value resistor 25 and the other base with the output of a voltage divider which comprises a variable resistor 26. This is connected on one side with a constant voltage source's positive pole and on the other side to earth through a fixed resistor 27. In this connection, it should be noted that all (+) marked connections should be taken to the positive pole of a constant voltage cource (not illustrated) preferably stabilised by Zener-diodes, all (−) marked connections to the negative pole of the same source and all earth connections to the null point of the same source. The output of the oscillator 19 is connected by a wire 28 to the input of a variable timing unit 29 which is in the form of a monostable multivibrator. The output of this is connected with the control terminal of a bidirectional thyristor 30 (also called a Two direction thyristor triode). The thyristor is connected in series with the A.C. circuit of a bridge rectifier 31 to an A.C. source in the form of the 220 volt 50 Hz mains supply. In the D.C. circuit of the bridge rectifier 31 lies the operating electromagnet 33 of the unit 6 which contains the metering pump 34. The pump chamber 35 is enclosed by the diaphragm 36 and the two non-return valves 37 and 38. The electromagnet 33 operates the diaphragm 36.

The voltage between the electrodes 7 and 8 changes by 57 mV at 24° C when the pH value alters by one unit. The voltage from the actual value transmitter 1 is therefore proportional to the pH value of the sewage. In the regulator 4 this voltage is compared with that from a potentiometer in the desired value transmitter 2. Any difference or error becomes a control signal which is amplified in the regulator 4 and taken from the regulator output via the voltage divider 20 and 21 to the resistor 22 where it becomes a control voltage U. The capacitor 23 tends to charge itself such that its voltage would reach the voltage U as final value. If the final value U is higher than the peak voltage $U_H$ of the uni-junction transistor 24, that is the voltage of the emitter of the uni-junction transistor, at which the transistor suddenly becomes conducting between the emitter and the base below, the capacitor 23 discharges itself through the resistor 25 each time its voltage u reaches the peak voltage $U_H$ whereupon it immediately begins to recharge itself again up to the peak voltage $U_H$. With the charging time constant T of the capacitor 29 the voltage on capacitor 23 as a function of time t is $$u = U[1 - e - t/T,] \qquad (1)$$

The time $t = t_H$ within which the capacitor 23 is charged to the peak voltage $U_H$ gives the frequency $f = 1/t_H$ of the oscillator 19.

From this one obtains $$u|t = t_H = U_H = U(1 - e^{-\frac{t_H}{T}}) \qquad (2)$$

$$\frac{U}{U_H} = x \qquad (3)$$

and $$\frac{T}{t_H} = y \qquad (4)$$

and by substituting (3) and (4) in (2)

$$y = \frac{1}{\ln \frac{x}{x-1}} \qquad (5)$$

From equation (5) it is clear that the frequency $f$ of the oscillator 19, which is proportional to $y$, has an inverse logarithmic relation to $x$ which is proportional to the control voltage U. If plotted in cartesian coordinates with both scales to a log base, then a straight line is obtained for the range of values $x \geq 1$, in which we are interested here. When $x < 1$, i.e. when the control voltage U is lower than the peak voltage $U_H$ the pulses of the oscillator 19 cease. The regulator 4 and the relation between the values of the resistors 20 and 21 are chosen such that the oscillator 19 just produces no pulses when the control signal or error signal is zero. When an error signal occurs, the oscillator 19 produces pulses with a frequency shown by equation (5). These pulses are then supplied to the timing unit 29 which reshapes than into square wave pulses of predetermined duration. During the duration of each of these square pulses the thyristor 30 is practically continuously conducting but alternately in both directions, because the given frequency of the A.C. voltage sourse 32 is essentially higher than the maximum frequency of the oscillator pulses. The thyristor 30 becomes non-conducting for only very short periods (when the alternating voltage from the A.C. source is at its null points) during the time when a square wave trigger pulse is applied to its gate terminal. After each null point of the alternating supply voltage, the thyristor 30 only remains non-conducting until the arrival of the next square wave trigger pulse. The A.C. current passing through the conducting thyristor 30 is rectified in the bridge rectifier 31, so that the electromagnet 20 is excited by rectified sinosoidal half wave pulses at 100 Hz during each square wave pulse from the timing unit 29. Because of the inertia of the electromagnet 33 these sinosoidal half wave pulses function like one continuous pulse during each of the trigger pulses. The duration and frequency of the triggering square pulses from the timing unit 29 determine, therefore, the duration and frequency of the pump strokes. An increasing error or control signal raises the repetition frequency of the pump strokes as given by equation (5), more than proportional, and vice versa, in accordance with the logarithmic relationship between the pH value and the $H_3O°$ concentration of the solution, i.e. the sewage water. Correspondingly the amount of selected additive passing through the pump 34 in the direction of the arrows from a container not shown is changed. Therefore when beginning a neutralisation of an acid solution, for a certain relative change in $H_3O°$ concentration down to the tenth part, for example, one needs a high, but with progressing neutralisation permenantly decreasing quantity of additive in the form of an alkali; after reaching the neutral point at pH = 7 the quantily of alkali to be added to increase the OH concentration is increased cntinuously similarly, the pH value of an alkali solution may be changed by adding an acid.

Depending on whether a base or an acid should be added to the solution the switch 3 may be moved to the opposite position so that the connection between the transmitters 1 and 2 on the one side and the regulator 4 on the other side be changed over in order to achieve a change of pH value in the correct direction. The switch can also be operated while crossing the neutral point if the pH value is to be changed beyond the neutral point.

By means of the adjustable resistor 22 the time constant of the charging rate of the capacitor 23 and consequently the frequency of the oscillator 19 and of the pump 34 can be set. The variable resistor 26 makes possible an adjustment of the peak voltage $U_H$ of the uni-junction transistor 24 whereby the frequency can also be influenced.

The amplifier and the resistor 20 are preferably adjusted to start the regulation only at a certain pH value and above this value the pump operates with maximum frequency.

If it is required to neutralise sewage water with a pH value of 10 to a value of 7, for example, the amplifier arrangement may be adjusted such that with a change from pH = 7 to pH = 8 full amplifier output is obtained, i.e. the control voltage U reaches its maximum value at ph = 8. The metering pump then runs in the range from pH = 10 to pH = 8 at full speed, for example at 6,000 strokes per hour. When, through the addition of the neutralising agent, pH = 8 is reached, the regulation takes over until pH = 7 is obtained and the metering pump stops. In this manner every other pH value at which the regulation is to begin my be adjusted for example by having the input and/or feedback resistors of the amplifier 12 and/or resistors in a diode clipper in the amplifier circuit adjustable. The input and feedback resistors in the amplifiers 9 and 18 may be similarly adjustable.

With a high initial error signal there is a rapid diminution of the error signal down to unity, which is then reduced to zero at continuously decreasing frequency. The result is a very sensitive and quick regulation with little expenditure.

A shunt provided across the thyristor 30 in the form at a resistor and capacitor in series serves to reduce the rate of change of the voltage across the load terminals of the thyristor 30 when inductive loads are used and the consequent risk of firing the thyristor by a high $du/dt$ at its load terminals.

The scope of the invention includes variations in the examples set out. Thus the Uni-junction-tranistor oscillator 19 can be replaced by an astable multivibrator. The expenditure on a Unijunction-transistor oscillator is nevertheless smaller. Another possible change is the control of rH values with a Redox reaction which likewise exhibits a logarithmic relationship.

In an embodiment of the regulating apparatus the following components and values were used:

| Resistor | Capacitor | Voltage | Ohms | Farad | Volts |
|---|---|---|---|---|---|
| 10 | | | 1 M | | |
| | 11 | | | 100–500 p | |
| 13 | | | 100 K | | |
| 14 | | | 2.7 K | | |
| 15 | | | 2.7 K | | |
| 16 | | | 100 K | | |
| 20 | | 0 to | 4.7 K | | |
| 21 | | | 10 K | | |
| 22 | | 0 to | 100 K | | |
| | 23 | | | 47 micro | |
| 25 | | | 150 | | |
| 26 | | 0 to | 1 K | | |
| 27 | | | 1.5 K | | |
| | | $U_B$ | | | 7 |
| | | U | | | 5.8 to 13.8 |

With the values listed, the pulse frequency lay between 10 and 102 pulses per minute.

The logarithmic relation between the pulse frequency and a control or error signal that varies may be at least approximately achieved with, for example, transducing elements having non-linear characteristics.

I claim:
1. Apparatus to regulate the pH value or other similar values of a solution comprising, an actual value transmitter, a desired value transmitter, a regulator controlled by said two transmitters for generating an error signal, pulse generator driven by said regulator for generating a control signal, a servo unit for adding controlled quantities of additive to said solution, said servo unit containing a metering pump for adding an additive, said pump being driven by pulses from said pulse generator, and the pulse frequency of said pulse generator bearing a logarithmic relationship with the amplitude of said error signal generated by the regulator to produce said control signal.

2. Apparatus as claimed in claim 1 wherein said pulse generator is a voltage controlled oscillator, said regulator being a difference amplifier fed by desired and actual voltages from said transmitters for producing a control voltage for said oscillator.

3. Apparatus as claimed in claim 2, wherein said oscillator includes a unijunction transistor.

4. Apparatus as claimed in claim 2 wherein said metering pump includes a stroke diaphragm and said servo unit includes an electromagnet for operating said diaphragm, circuit means having an A.C. voltage source, said circuit means including a thyristor and said electromagnet, a timing unit for transmitting said oscillator control signal to the gate of said thyristor for operating said electromagnet is in circuit with the thyristor and the frequency of said A.C. voltage source being higher than the frequency of said oscillator pulses.

5. Apparatus as claimed in claim 4 wherein said circuit means includes a bridge rectifier with said A.C. source and said thyristor being in the A.C. circuit thereof and said electromagnet being in the D.C. circuit thereof said thyristor being a twodirection thyristor triode.

6. Apparatus as claimed in claim 1 including switch means for interchanging the connections of said transmitters with said regulator.

7. Apparatus as claimed in claim 1 wherein each said error signal higher than a certain preselected value is linked with the maximum frequency of said pulse generator, said preselected value being lower than the range of values generated by said actual value transmitter.

* * * * *